Sept. 16, 1952 L. HORNBOSTEL 2,610,719
REINFORCED SPLIT CLUTCH PLATE
Filed Oct. 19, 1948
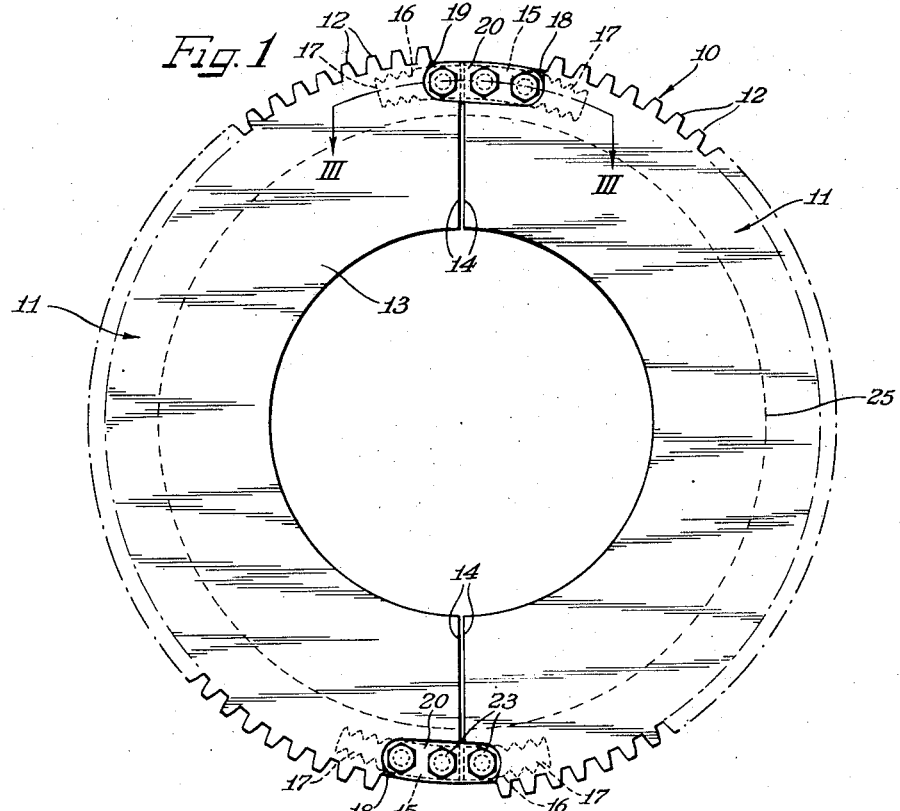
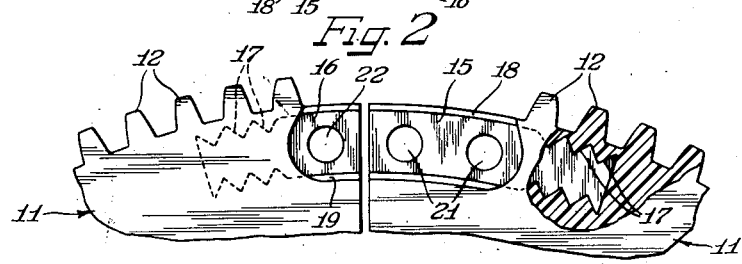
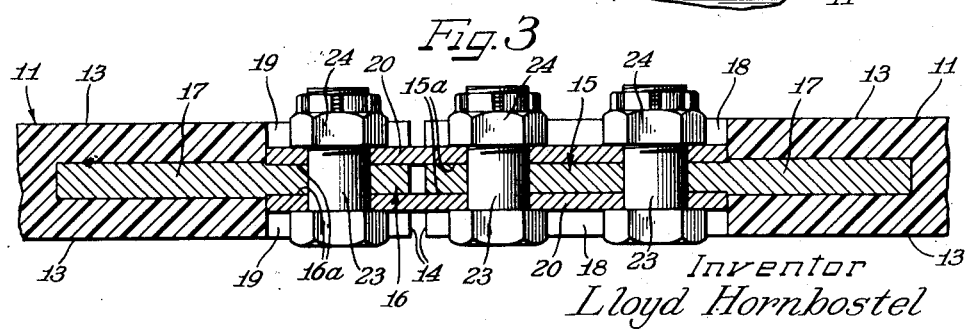
Inventor
Lloyd Hornbostel Patented Sept. 16, 1952

2,610,719

UNITED STATES PATENT OFFICE 2,610,719

REINFORCED SPLIT CLUTCH PLATE

Lloyd Hornbostel, Beloit, Wis., assignor to Beloit Iron Works, Beloit, Wis., a corporation of Wisconsin Application October 19, 1948, Serial No. 55,290

5 Claims. (Cl. 192—107)

This invention relates to clutch plates adapted for clutches of the type disclosed in my copending application Serial No. 590,454, filed April 26, 1945, now issued as U. S. Patent No. 2,467,830, dated April 19, 1949, wherein half plate sections are disposed around a central shaft or hub and are anchored together in fixed relationship by means of clamps which are secured to the plate sections.

Specifically, the invention relates to a molded plastic clutch plate composed of two identical half sections, each of which has embedded therein reinforcing straps of metal or other rigid material to coact with connector links for fixedly uniting the half sections in operative relationship whereby the plate can be easily installed around a shaft or hub without uncoupling the shaft or hub.

Clutches of the type disclosed in my aforesaid copending application Serial 590,454 have clutch plates with teeth around the periphery thereof for splined relationship with a clutch housing or surrounding ring. The faces of these clutch plates are engaged by clutch shoes or the like so that the plates will couple the surrounding ring with the shoes to complete the driving connection. Such clutches are frequently used in installations where replacement of a worn or broken plate requires uncoupling of shaft parts, disassembly of clutch members, and the like time-consuming operations. The clutch plates of the present invention now eliminate these heretofore-required uncoupling and disassembly operations, because they are provided in mating half rings which are easily disposed around a central shaft or clutch part and are quickly secured together to form the complete ring-like plate.

According to this invention, the clutch plate sections each have an embedded connector strap adjacent their mating edges. These straps extend into the body of the plate segment and have exposed faces for receiving connector links thereagainst. Nuts and bolts join the links with the straps to rigidly connect the plate sections.

A feature of the invention resides in the provision of identical half plate sections for clutches which can only be connected in proper relationship to form the completed clutch plate.

Another feature of the invention resides in the provision of a molded plastic clutch plate having its own friction faces and spline teeth together with metal inserts to be straddled by connecting links for uniting the sections to complete the plate.

It is, then, an object of this invention to provide a split clutch plate for a clutch of the type disclosed in application Serial 590,454, filed April 26, 1945.

Another object of the invention is to provide a reinforced connector for split clutch plates.

A still further object of the invention is to provide identical half ring sections with reinforced connector straps which will hold the sections in end to end relation for forming a complete clutch plate.

A still further object of the invention is to provide a multi-piece clutch plate having the pieces thereof held in proper end to end relation by means of embedded straps and connecting links straddling these straps.

A still further object of the invention is to provide a molded plastic clutch plate composed of mating sections and having metal inserts for uniting the sections.

A still further object of the invention is to provide a lightweight, strong molded plastic clutch plate composed of ring segments each having embedded metal straps for coacting with straddling links to hold the sections in flat end to end relation to produce a complete ring-like clutch plate.

Other and further objects of the invention will be apparent to those skilled in the art from the following detailed description of the annexed sheet of drawings which, by way of a preferred example only, illustrates one embodiment of the invention.

As shown on the drawings:

Figure 1 is a plan view of a clutch plate of this invention.

Figure 2 is an enlarged fragmentary plan view, with parts in longitudinal cross section, illustrating the embedded connector straps of the clutch plate segments.

Figure 3 is an enlarged fragmentary transverse cross-sectional view, with parts in elevation, taken along the line III—III of Figure 1 and illustrating the straddling links coacting with the connector straps for holding the plate segments in end to end relation.

On the drawings:

The clutch plate 10 of Figure 1 is composed of identical half ring sections 11, 11. Each ring section has spline teeth 12 around the outer periphery thereof and flat gripping faces 13 on the side thereof inwardly from these teeth 12. Each segment 11 has a flat radial edge 14 at the ends thereof so that the two sections, when held in end to end aligned relation, form a complete ring. The sections 11 are preferably composed of thermoplastic or thermosetting material and may, if desired, be composed of a laminated plastic and fibrous sheet material.

Each section 11, 11 has embedded therein a rigid metal connector strap which extends inwardly from the radial edge 14 thereof along the outer periphery of the segment. Two different types of straps are used in opposite ends of the segments. Thus, each segment 11 has one long metal strap 15 with two bolt holes therethrough and one short metal strap 16 with one bolt hole therethrough. Each strap 15 and 16 has a serrated or notched inner end 17 for better anchoring the strap to resist axial loads.

As best shown in Figure 3, the straps 15 and 16 have their ends 17 embedded in the transverse central portion of the segments 11, 11 and the faces of these segments are recessed to expose the outer ends of the straps. An end mill cutter can be used to form the recesses and to dress the side faces of the strap portions. As illustrated, long recesses 18, 18 are formed on both sides of the plate 11 to expose the side faces of the long strap 15, while short recesses 19, 19 are formed on both faces of the other plate 11 to expose the shorter strap 16. The teeth 12, as shown in Figures 1 and 2, do not extend to the edges 14 of the segments, but, on the other hand, terminate at the ends of the recesses 18 and 19. Thus, on one end, in the embodiment shown, the segment 11 is minus four teeth 12 while at its other end it is minus one tooth 12 due to the difference in the lengths of the recesses 18 and 19. These spline teeth 12 need not extend completely around the periphery of the plate 10 because a sufficient number of teeth are provided on each section 11, 11 to carry the clutch load and to suitably spline the plate in the surrounding clutch housing or ring.

As indicated in Figure 3, the side faces of the straps 15 and 16 which are exposed in the recesses 18 and 19 can be dressed down by the end milling cutter so that these faces will be parallel with the side faces 13 of the segments 11. As indicated, the side faces 15a of the strap 15 in the recesses 18 have been cut down so that the exposed portion of the strap is thinner than the anchoring portion 17. A similar side face arrangement 16a is provided for the strap 16.

Rigid metal connecting links 20, 20 are disposed in the recesses 18 and 19 to straddle the exposed portions of the straps 15 and 16. Each link 20 has three bolt holes therethrough arranged in equally spaced relation so that the links can be used interchangeably to register with the two bolt holes 21 of the long strap 15 and the single bolt hole 22 of the short strap 16. Bolts 23 extend through each of the holes in the links and straps. Nuts 24 on these bolts draw the links into tight face to face engagement with the exposed faces 15a and 16a of the straps. The links thereupon hold the segments 11, 11 in aligned end to end relationship, the arrangement being such that the radial ends 14 of the segments are slightly spaced apart as illustrated in Figure 1 so that any inaccuracies in these edges will not interfere with full mating relationship of the segments.

Since each segment 11 contains a long strap with two bolt holes at one end and a short strap with a single bolt hole at the other end, the segments are identical and yet must be put together in proper mated relationship to form the completed plate 10. As indicated by the circular dotted line 25 in Figure 1, the gripping face of the clutch does not extend radially outward beyond this line so that the clutch shoes are always inwardly of the links 20 and connecting nut and bolt assemblies.

From the above descriptions it should be understood that the invention now provides a clutch plate composed of segments which are held together in proper end to end mated relationship to form a complete plate ring, and wherein embedded connecting straps coact with straddling connecting links to provide a rigid, fool-proof assembly arrangement that is quickly connected and disconnected.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A clutch plate comprising a plurality of plate segments each composed of a fragmental ring portion having flat clutch faces, peripheral teeth, and radially extending free edges, an arcuate rigid connector strap embedded in each segment adjacent the radial edge thereof and radially inwardly from the peripheral teeth, one end portion of each of said straps being completely surrounded by the associated segment and the opposing end portion of each of said straps having the sides thereof exposed adjacent said radial edge, said straps of adjacent segments being adapted to be aligned in end-to-end relationship upon assembly of said segments, rigid connector links straddling the exposed end portions of aligned adjacent straps, and a nut and bolt assembly clamping the straps in extended surface contact to join the segments for forming a rigid clutch plate frame.

2. A molded plastic clutch plate comprising a pair of semi-annular molded plastic plate segments having spline teeth around the outer peripheral edge thereof, friction faces on the sides thereof inwardly from the teeth, and radially extending end edges on diametrically opposite sides of a semicircular recess formed thereby, metal straps embedded in each of said segments between said spline teeth and said friction faces, said straps being adjacent each radial edge of said plate segments and having end portions extending into the segments away from said edge to be retained thereby, said straps having bolt holes therethrough, connector links straddling the straps adjacent the end edges of the segments, and bolts extending through the links and straps for clamping the straps between the links in direct extended contact therewith to hold the segments in aligned end-to-end relation for forming a complete clutch plate ring without interfering with the plate spline teeth or the friction faces.

3. In a split clutch plate assembly including a plurality of plate segments, the improvement of a short connector strap and a long connector strap embedded in each segment adjacent the mating edges thereof, the long connector strap having a plurality of bolt holes therethrough, the short connector strap having a single bolt hole therethrough, recesses in each of the opposed faces of the segments adjacent the mating edges thereof exposing portions of the side faces of the straps and the bolt holes therein, rigid links seated in each of said recesses straddling the opposed and exposed side faces of the straps, and nut and bolt assemblies extending through said links and the bolt holes of said straps for clamping the links to the straps in extended surface contact therewith.

4. A molded clutch plate comprising a plurality of arcuate plate sections, each having a pair of metal straps embedded therein intermediate the side faces thereof and terminating flush with the mating edges thereof, said embedded straps having serrated root portions and apertured connecting portions, said root portions being completely enclosed within said sections to anchor said strap therein and the connecting portions having both faces thereof exposed, links straddling the apertured connecting portions of the straps, and nut and bolt assemblies clamping the links of said exposed portions of the straps in extended surface contact with each face thereof for holding the segments in aligned end-to-end relationship.

5. An annular clutch plate of a molded plastic matrix defining spline teeth at the outer peripheral edge thereof and friction faces on the sides thereof inwardly from the teeth, said plate being split into two halves along a diameter thereof and notched inwardly at the extremities of said diameter, each of said halves having a pair of metal straps embedded therein and extending into said notches so as to be exposed on both sides and terminating flush with said diameter, said straps having serrated root portions embedded in said halves and having bolt holes in the portions extending into said notches, in each half one of said straps having a single bolt hole and the other having a plurality of bolt holes, rigid links straddling the portions of opposite straps containing the bolt holes and positioned against the exposed sides of said straps in said notches and nut and bolt assemblies in said notches clamping said links and said straps together to hold the halves in aligned end-to-end relationship, the clamping being effected by metal-to-metal contacts involving said links, said straps and said nut and bolt assemblies.

LLOYD HORNBOSTEL.

REFERENCES CITED

The following references are of record in the file of this patent:

UNITED STATES PATENTS

| Number | Name | Date |
| --- | --- | --- |
| 379,198 | Fee | Mar. 16, 1888 |
| 1,082,668 | Wines | Dec. 30, 1913 |
| 1,171,994 | Westlund | Feb. 15, 1916 |
| 1,566,704 | Stevens | Dec. 22, 1925 |
| 1,625,933 | Bing | Apr. 26, 1927 |
| 1,888,779 | Tower | Nov. 22, 1932 |
| 2,108,059 | Glasner | Feb. 15, 1938 |
| 2,159,326 | Harwood et al. | May 23, 1939 |
| 2,218,614 | McCune | Oct. 22, 1940 |
| 2,237,624 | Oldham | Apr. 8, 1941 |
| 2,247,298 | Kattwinkle | June 24, 1941 |
| 2,303,201 | Eason | Nov. 24, 1942 |
| 2,330,856 | Adamson | Oct. 5, 1943 |

FOREIGN PATENTS

| Number | Country | Date |
| --- | --- | --- |
| 247,808 | Switzerland | Mar. 31, 1947 |
| 895,135 | France | Jan. 16, 1945 |
| 403,513 | Great Britain | Dec. 28, 1933 |